Jan. 3, 1950   W. C. HEATH   2,493,140
SHAFT EXTENSION FOR ELECTRIC MOTORS
Filed April 24, 1944
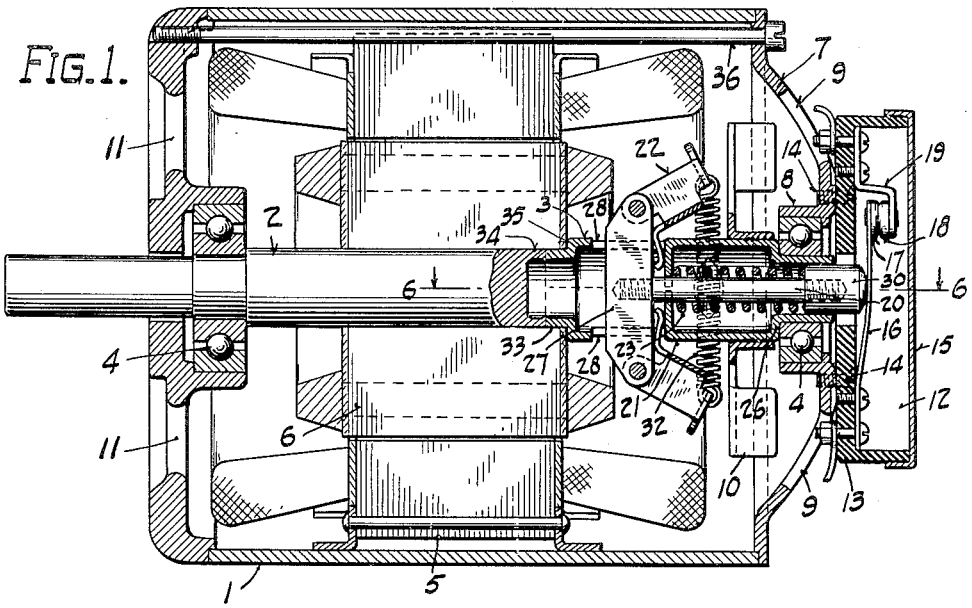
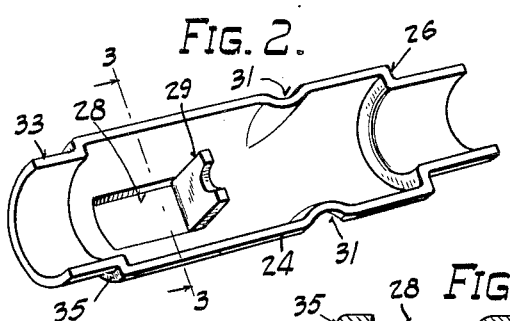
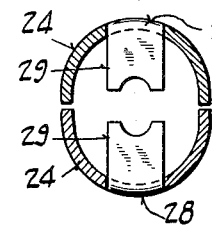
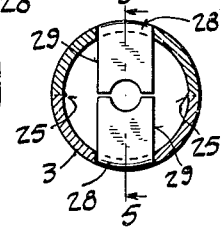
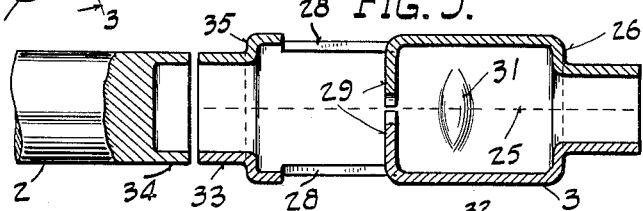
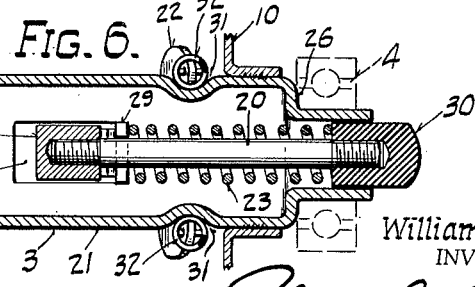
William C. Heath
INVENTOR.
BY
ATTORNEY.

Patented Jan. 3, 1950

2,493,140

UNITED STATES PATENT OFFICE 2,493,140

SHAFT EXTENSION FOR ELECTRIC MOTORS

William C. Heath, Shorewood, Wis., assignor to A. O. Smith Corporation, Milwaukee, Wis., a corporation of New York Application April 24, 1944, Serial No. 532,459

4 Claims. (Cl. 318—325)

1

This invention relates to a shaft extension for an electric motor drive shaft and has particular use in connection with the switch operating mechanism described and claimed in the co-pending application of Lloyd Yost entitled "Switch operating mechanism," filed March 27, 1943, Serial No. 480,785, now Patent No. 2,394,283.

Heretofore the switch operating mechanism of the application referred to has been employed with a motor shaft that is made longer than the usual shaft and bored out and otherwise machined to accommodate the mechanism. This involves a great deal of machining resulting in increased costs in producing the motor.

In order to decrease the cost of production and eliminate excessive scrap material the invention proposes to provide a short motor shaft and then weld thereto a pre-formed shaft extension adapted to accommodate the switch mechanism.

The invention may be carried out by pressing two sheet metal members to the proper complementary semi-tubular shape and then welding them together along longitudinal lines to provide the shaft extension that is to be welded to the end of the motor shaft.

One object of the present invention is to provide a substantially light weight shaft extension that can withstand hard use in service.

Another object is to provide a shaft extension that can be fabricated without excessive and costly machining operations.

A further object is to provide a shaft extension that can be readily assembled with a motor shaft.

These and other objects of the invention will appear in the description of an embodiment of the invention as employed with an electric motor shaft and illustrated in the accompanying drawing.

In the drawing:

Figure 1 is a longitudinal central section of a motor embodying the invention and showing the extension welded to the motor shaft;

Fig. 2 is a perspective view of one of the shaft extension halves after forming and before welding;

Fig. 3 is a transverse section taken on the line 3—3 of Fig. 2 of two halves positioned for welding;

Fig. 4 is a similar section after the welding and trimming operations;

Fig. 5 is a longitudinal section taken on line 5—5 of Fig. 4 showing the finished shaft extension and a portion of the motor shaft positioned for welding; and

2

Fig. 6 is a fragmentary section taken on the line 6—6 of Fig. 1.

Referring to the drawing, the electric motor has a housing 1 carrying a longitudinally disposed motor shaft 2 with a shaft extension 3. The shaft 2 and extension 3 rotate in suitable bearings 4 provided at each end of the housing 1.

A stator 5 is suitably secured to the inside of the housing 1 and a rotor 6, preferably of the squirrel cage type, is secured to the shaft 2 to complete the motor parts for the purposes of this application.

A cover 7 provides a closure for one end of housing 1 and may be secured thereto by screws or other means. An inturned flange 8 disposed at the central portion of cover 7 provides a seat for bearing 4 in which the outer end of shaft extension 3 is journaled.

Suitable air openings 9 may be provided in cover 7 through which air may be drawn by fan 10 to cool the motor parts. The air is forced through spaces between the stator and rotor and stator and housing and flows out through openings 11 at the other end of the motor.

The shaft extension 3 of shaft 2 terminates in a switch housing 12 having its inner plate 13, preferably of insulating material, secured to cover 7 of the motor by screws 14. The housing 12 is covered by a suitable cap 15.

As shown and described in the co-pending application of Lloyd Yost for "Switch operating mechanism," heretofore referred to, the switch mechanism in general comprises the spring arm 16 secured to plate 13 carrying contact 17 disposed to engage contact 18 on the bracket 19 also secured to plate 13.

Spring arm 16 is biased to normally open the contacts 17 and 18, and the latter are moved into engagement as shown by a push rod 20 disposed axially of the central tubular portion 21 of extension 3 and axially reciprocated by the governor 22 and spring 23. The governor 22 in turn is actuated by the speed of the motor shaft 2.

The engagement and disengagement of contacts 17 and 18 by means of the governor operated mechanism closes and opens a circuit, not shown, for the purposes disclosed in the co-pending application above referred to.

Referring now more particularly to the present invention, the shaft extension 3 has a tubular body pressed from sheet metal and formed of two semi-cylindrical half members 24, such as the half member shown in Fig. 2. The half members are complementary to each other and are joined at their marginal edges by welds 25 extending longitudinally of the two members as illustrated in Figs. 4 and 5.

In the embodiment illustrating the invention the central cylindrical portion 21 extends for substantially the entire length of the extension 3. A shoulder 26 of the extension 3 engages the bearing 4 in which the outer end of extension 3 rotates.

A transverse bar 27 extends through opposite slots 28 in the wall of the extension 3 and the slots extend longitudinally of the extension to allow reciprocation of the bar 27 axially of the extension. The inner end of push rod 20 is secured to the center of bar 27 to effect axial movement of rod 20 by the governor in one direction and by the spring 23 in the other direction.

In order to provide slots 28 ears 29 are struck radially inwardly of each half member 24 and outwardly toward the outer end of the extension 3 as illustrated in the drawings. The ears 29 have registering semi-circular slots in their adjacent edges and provide the inner bearing for rod 20. They also serve as the inner abutment for the spring 23 disposed around the rod 20.

A head 30 provided on the outer end of push rod 20 has a sliding bearing in the reduced outer end of member 3 and provides the outer abutment for spring 23.

Grooves 31 are disposed on the outer surface of each half member 24 to retain springs 32 of governor 22 when the motor is traveling at low speeds.

The inner end 33 of each member 24 of the shaft extension 3 is fabricated in a manner to provide for electric flash welding of the same to the end of motor shaft 2.

Before the shaft extension 3 is assembled with the motor shaft 2, the end of the motor shaft is machined out to provide a cylindrical end flange 34 for welding.

The shaft extension is then butt welded to the motor shaft 2, preferably by flash welding the end 33 of the shaft extension to the end flange 34 of the motor shaft. The weld is then machined flush with the surface of the shafts and the rotor lamination forced onto the shaft against the shoulder 35 at the inner end of the portion 21 of the extension.

The switch operating mechanism and fan 10 are then assembled with the shaft extension. The fan 10 may be secured to the tubular portion 21 in any suitable way such as by spot welding. In some types of motors the fan may be dispensed with.

The motor shaft is then assembled in the housing 1 and the end cover 7 containing the bearing 4 is secured to the motor housing by several screws 36 one of which is shown.

The invention provides an efficient shaft that may be employed with a switch operating mechanism. The shaft is economically fabricated as considerable savings in labor and metal are made possible by substantially eliminating machining operations.

Various embodiments of the invention may be employed within the scope of the accompanying claims.

I claim:

1. In combination in an electric motor, a housing, a solid shaft section journaled in the drive end of said housing, a pressed sheet metal tubular extension secured to said shaft section and journaled in the other end of the housing, a stator in said housing, a rotor fixed on the composite shaft against an abutment on the tubular extension, and switch actuating mechanism carried by said tubular extension for controlling said motor.

2. In an electric motor, a tubular pressed metal shaft extension for carrying switch actuating mechanism including a spring biased longitudinally reciprocating central push rod and a transverse governor bar for operating the same, said tubular extension having slots in its opposite sides for receiving said transverse bar and ears struck inwardly from said slots to provide a central support for said push rod and a fixed support for one end of a biasing spring on said rod.

3. In combination with a motor, a housing, a shaft journaled in said housing, a pressed sheet metal tubular member secured to said shaft and having diametrically opposed slots in the walls thereof, a governor mounted on said member and having a transverse bar extending through the slots in said member, a longitudinally reciprocating push rod biased within said member and engaging said transverse bar, and switch mechanism actuated by the reciprocating push rod through the operation of the governor upon rotation of the shaft and member to control said motor.

4. In combination with a motor, a housing, a solid shaft journaled in one end of said housing, a pressed sheet metal tubular member secured to the inner end of said shaft and journaled in the other end of said housing and having diametrically opposed slots in the walls thereof, a governor assembled with said tubular member and comprising a spring disposed around the member and a transverse bar connected to said spring and projecting through said slots with the slots being of a length providing for reciprocation of the bar in a direction longitudinal of said member, a spring biased longitudinally reciprocating push rod supported axially within said member and secured at one end to said bar and projecting outwardly of said member at the other end, and a switch mechanism mounted on said housing and engaged by the outer end of the push rod through the operation of the governor upon rotation of the shaft and tubular member to control said motor.

WILLIAM C. HEATH.

REFERENCES CITED

The following references are of record in the file of this patent:

UNITED STATES PATENTS

| Number | Name | Date |
| --- | --- | --- |
| 516,651 | Hochhausen | Mar. 20, 1894 |
| 848,292 | Dawson | Mar. 26, 1907 |
| 2,067,282 | Padgett | Jan. 12, 1937 |
| 2,083,411 | Swanson | June 8, 1937 |
| 2,099,050 | Chamberlain | Nov. 16, 1937 |

FOREIGN PATENTS

| Number | Country | Date |
| --- | --- | --- |
| 344,340 | Great Britain | Mar. 2, 1931 |